United States Patent [19]

Sutton et al.

[11] 4,174,823

[45] Nov. 20, 1979

[54] MOTOR VEHICLE REAR-VIEW MIRRORS

[75] Inventors: Christopher J. Sutton, Leamington Spa; Leonard Trigg, Stockton, both of England

[73] Assignee: Desmo Limited, Warwickshire, England

[21] Appl. No.: 871,445

[22] Filed: Jan. 23, 1978

[51] Int. Cl.² ............................................. B60R 1/06
[52] U.S. Cl. .................................... 248/582; 248/481
[58] Field of Search .................. 248/475 B, 481, 482, 248/483, 484, 204; 74/501 M

[56] References Cited

U.S. PATENT DOCUMENTS

| | | | |
|---|---|---|---|
| 2,457,639 | 12/1948 | Brooks | 248/481 |
| 2,968,995 | 1/1961 | Holden | 248/481 X |
| 2,995,983 | 8/1961 | Davis | 248/160 X |
| 3,347,513 | 10/1967 | Liedel | 248/483 |
| 3,474,998 | 10/1969 | Talbot | 248/484 X |
| 3,828,623 | 8/1974 | Zillner | 74/501 M |

FOREIGN PATENT DOCUMENTS 2462308 11/1976 Fed. Rep. of Germany ........ 74/501 M
2315412 1/1977 France ................................ 248/475 B Primary Examiner—William H. Schultz
Attorney, Agent, or Firm—Shrivener, Parker, Shrivener & Clark

[57] ABSTRACT

A rear view mirror for a motor vehicle of the kind having a stationary housing relative to which the reflective element is adjustable to give the required rear view has a housing which is moulded in self-skinning foam plastics. The housing has resilient pillars which bear on the back of the reflective element near its periphery. The pillars extend from the part of the housing behind the reflective element. Vibration of the reflective element is damped by contact with the resilient material of the housing and the reflective element is kept in its adjusted position. This is very useful when the reflective element is adjustable by remote control.

8 Claims, 5 Drawing Figures

MOTOR VEHICLE REAR-VIEW MIRRORS

This invention relates to rear view mirrors for motor vehicles of the kind comprising a housing in relation to which the reflective element is adjustable to enable the driver to obtain the required rear view. The reflective element is mounted in the housing by a central ball or equivalent adjustable joint. The housing is usually in the form of a cowl with a rim extending over the edge of the reflective element.

With rear view mirrors of the kind described vibration of the reflective element can be a problem and it is an object of the present invention to provide means of reducing this vibration.

It is an object of the present invention to provide a rear view mirror for a motor vehicle comprising a housing adapted to be secured to the vehicle, a reflective element mounted in the housing by an adjustable joint which enables the reflective element to be adjusted in relation to the housing to alter the rear view, wherein the housing is a moulding of self-skinning foam plastics material which bears resiliently on the reflective element remote from the adjustable joint.

By "self-skinning foam plastics" is meant a plastics which in the course of the moulding process, while maintaining a cellular structure in the interior of the moulding, forms on its exterior surface a continuous skin.

The foam plastics is preferably a self-skinning polyurethane foam. This material is inherently resilient, and yet has self-damping properties which are utilised in the invention to damp vibrations of the reflective element.

The housing may bear resiliently on the back of the reflective element near its periphery and substantially in the direction of movement of the periphery about the adjustable joint and with counteracting effect on opposite sides of the adjustable joint. There may be resilient projection in the form, for example, of pillars of elastic foam material extending from the housing to engage the back of the reflective element. The pillars are preferably pre-loaded when the reflective element is assembled in the housing, to an extent sufficient to ensure contact between the pillars and the back of the reflective element in all adjusted positions of the reflective element. There could, for example, be several separate pillars of columnar form or a pair or pairs of pillars of relatively thin but elongated cross-section, the pillars of the or each pair being arranged parallel to one another on opposite sides of the adjustable joint.

As foam material of the housing bears on the reflective element directly, vibration damping is provided at a position where a small force will be most effective in damping vibration. The bearing contact also assists the adjustable joint in maintaining adjustment. This is particularly valuable when the adjustable joint is associated with a remote control mechanism enabling an exterior rear view mirror to be adjusted from inside the vehicle. The bearing contact then helps to overcome any instability of the reflective element due to backlash in the remote control mechanism.

Although rear view mirrors of the kind described will usually be exterior mirrors mounted on the wing, door, or windscreen pillar or other part of the vehicle body, the invention is also applicable to such mirrors intended as interior rear view mirrors for which the foam plastics housing can be of particular advantage in afforting protection against personal injury.

Embodiments of the invention are illustrated in the accompanying drawings in which.

Figure 1:
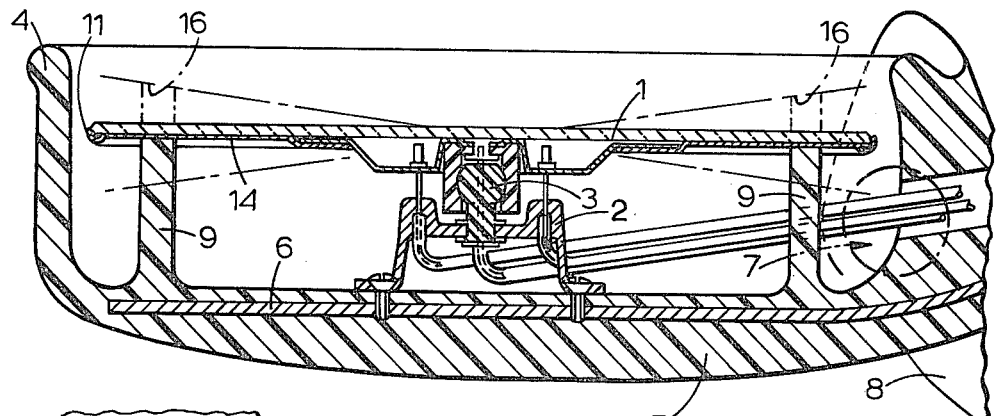
FIG. 1 is a diagrammatic plan section of one form of rear view mirror according to the invention.

A reflective element 1 adjustable by remote control mechanism 2 about the centre of an adjustable joint 3 is mounted within a cowl 4 of a housing 5 moulded in self-skinning foam plastics. A metal plate 6 is moulded into the housing to re-inforce it and this is connected by a yieldable joint 7 to an attachment member 8 for securing the rear mirror to the vehicle body. The yieldable joint 7 may be of the kind which allows the rear view mirror to deflect when struck and then restores it to the operative position afterwards. Alternatively the yieldable joint may merely allow the rear view mirror to move out of the way when struck after which it must be put back manually.

Figure 2:
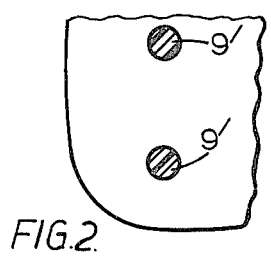
FIGS. 2 and 3 are fragmentary cross-sectional views of alternative pillars of the rear view mirror of FIG. 1.
Figure 3:
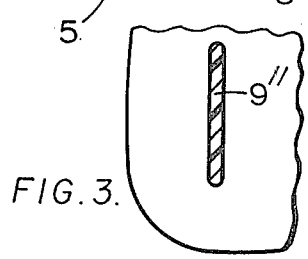
Figure 4:
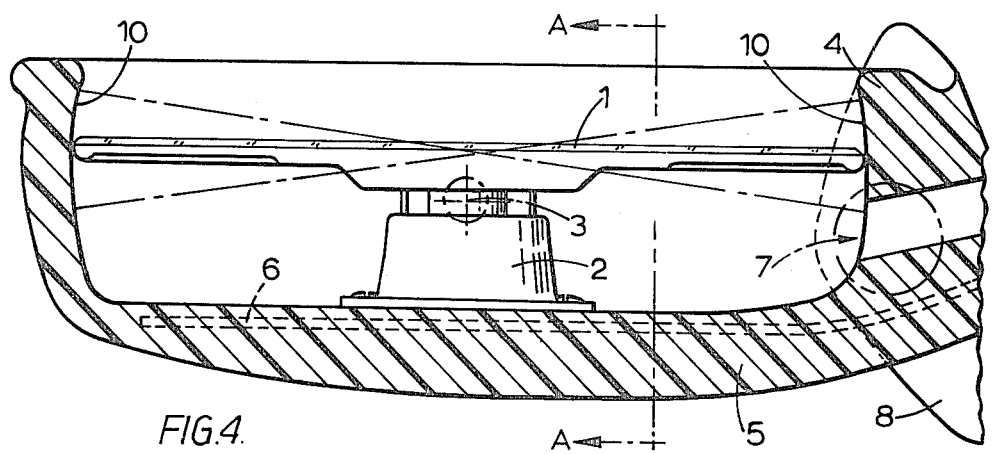
Figure 5:
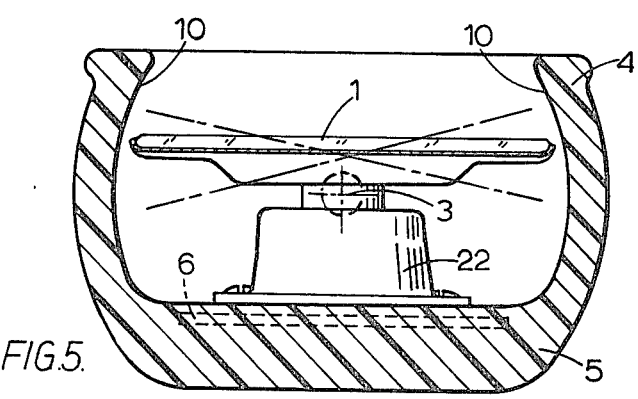

In the embodiment of FIG. 1, inside the cavity of the cowl 4, pillars 9 are formed in the foam plastics moulding of the housing 5 on opposite sides of the adjustable joint 3 and extend forwards to bear on the back 14 of the reflective element near its periphery 11. In the middle position of the adjustment shown in the drawing the pillars 9 are axially pre-loaded and will continue, for much of the range of the adjustment, to bear at 16 on the back of the reflective element when the adjacent edge of the reflective element is moved away from the back of the cowl. In the opposite direction of adjustment the pillars 9 may buckle or distort but will still maintain pressure on the reflective element. As indicated by FIG. 2 there may be two pillars 9 on each side of the adjustable joint so that the four pillars may be considered as lying at the corners of a rectangle. Alternatively, as shown in FIG. 3, there may be a single pillar 9″ of relatively thin elongated cross-section on each side of the adjustable joint. The two pillars 9″ are parallel to one another.

The pillars 9′ or 9″ maintain pressure on the back of the reflective element tending to restore the reflective element to an equilibrium position so that any back-lash in the remote control mechanism 2 is taken up.

We claim:

1. A rear view mirror for a motor vehicle comprising a housing adapted to be secured to the vehicle, a reflective element, an adjustable joint by which the reflective element is mounted in the housing and which enables the reflective element to be adjusted in relation to the housing to alter the rear view, wherein the housing is a moulding of self-skinning foam plastics material and includes resilient projections which are integrally formed in the foam material of the housing and which bear on the back of the reflective element on opposite sides of the adjustable joint and remote from the adjustable joint.

2. A rear view mirror according to claim 1, wherein the housing is cowl-shaped and has a rim extending over the periphery of the reflective element.

3. A rear view mirror according to claim 2 wherein the rim bears at least on opposite edges of the periphery, resiliently gripping the reflective element.

4. A rear view mirror according to claim 3 wherein the interior of the rim where it makes contact with the periphery is of generally part-spherical form centered on the adjustable joint.

5. A rear view mirror according to claim 4 wherein the interior of the rim has a surface formation which assists in relaxing the reflective element in adjustment.

6. A rear view mirror for a motor vehicle comprising a housing adapted to be secured to the vehicle, a reflective element, an adjustable joint by which the reflective element is mounted in the housing and which enables the reflective element to be adjusted in relation to the housing to alter the rear view, wherein the housing is a mounding of self-skinning foam plastics material comprises pillars and of resilient foam material extending from the housing behind the reflective element and arranged in at least one pair, the pillars of which are symmetrically disposed on opposite sides of the adjustable joint.

7. A rear view mirror according to claim 6 wherein the pillars are of columnar form.

8. A rear view mirror according to claim 6 wherein the pillars are of elongated cross-section and parallel to one another.

* * * * *